Aug. 5, 1969  C. J. COBERLY ET AL  3,459,823
FUEL NOZZLES FOR HIGH TEMPERATURE FURNACE
AND METHOD OF OPERATING
Filed March 7, 1967  3 Sheets-Sheet 1
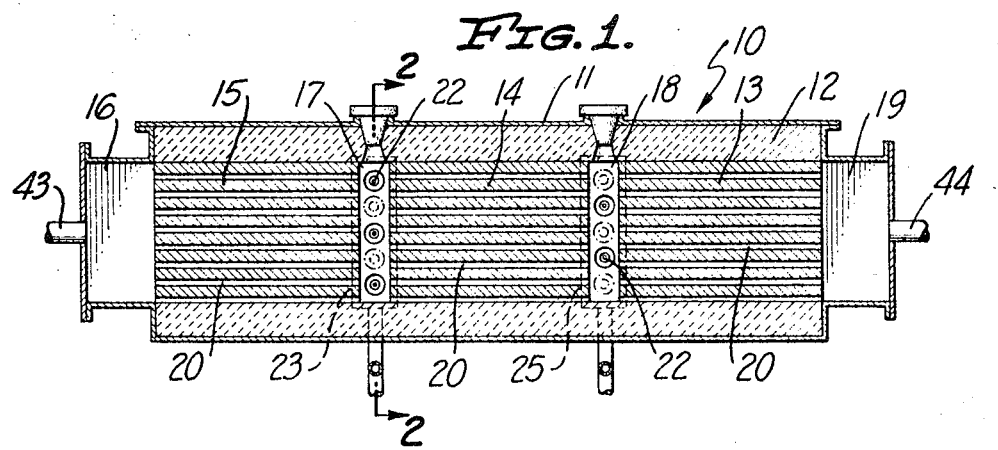
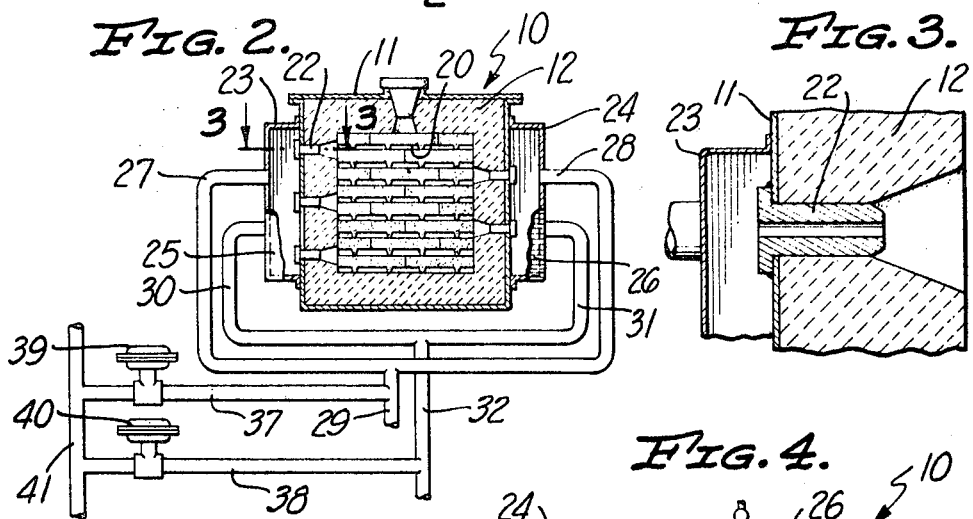
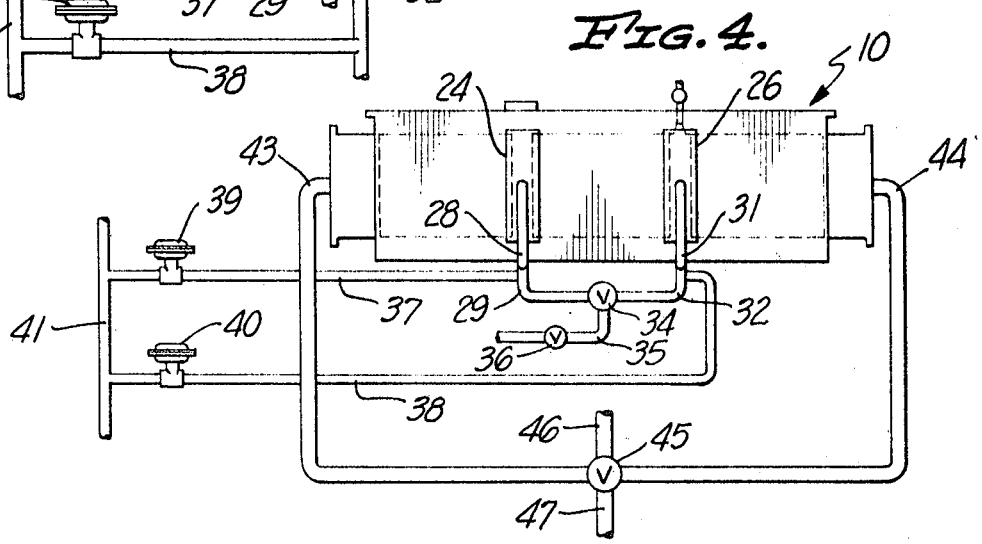
INVENTORS
CLARENCE J. COBERLY,
VAL KOGUT
BY THEIR ATTORNEYS
HARRIS, KIECH, RUSSELL & KERN

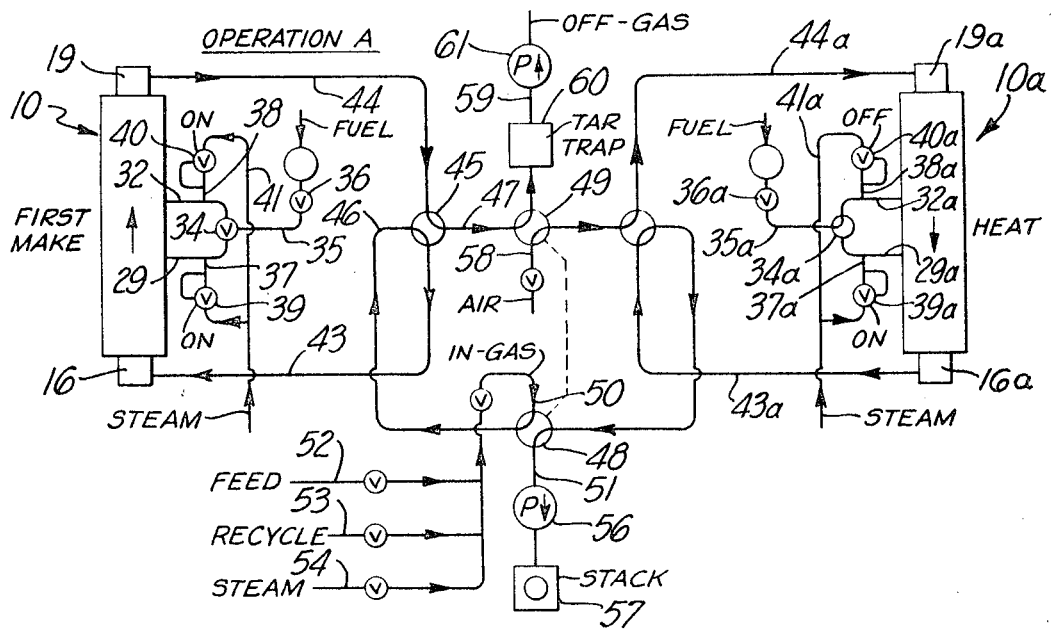
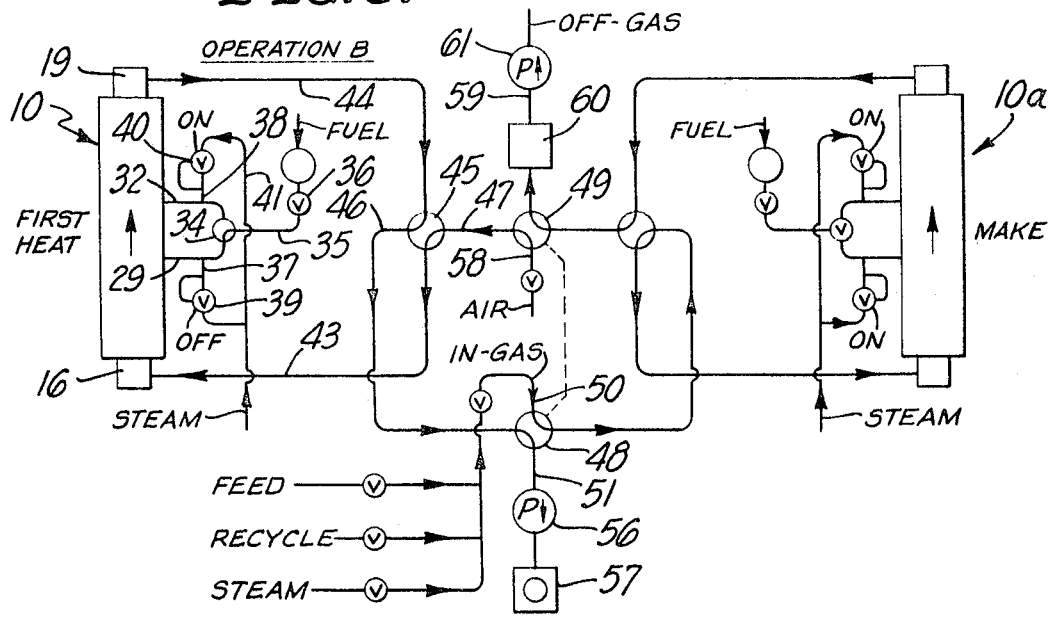

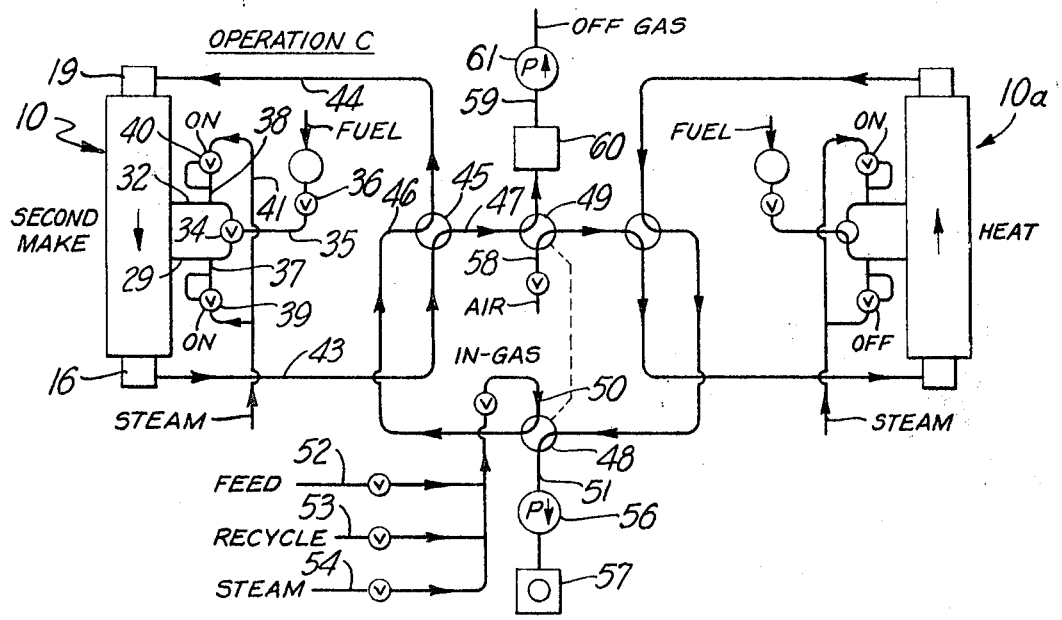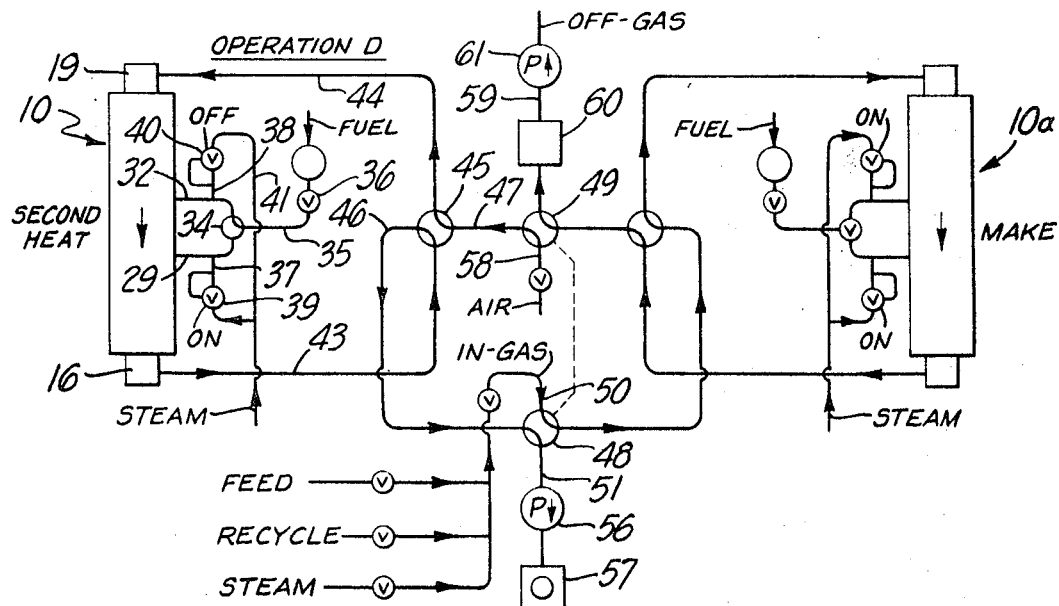

United States Patent Office 3,459,823
Patented Aug. 5, 1969

3,459,823
FUEL NOZZLES FOR HIGH TEMPERATURE FURNACE AND METHOD OF OPERATING
Clarence J. Coberly, San Marino, and Val Kogut, Long Beach, Calif., assignors to Union Carbide Corporation, New York, N.Y., a corporation of New York
Filed Mar. 7, 1967, Ser. No. 621,331
Int. Cl. C07c 3/30, 11/24
U.S. Cl. 260—679        7 Claims

ABSTRACT OF THE DISCLOSURE

A method of operating a regenerative furnace having nozzles for intermittently introducing fuel gas into a high temperature zone of the furnace, in which the nozzles are kept substantially below the temperature of the zone at all times by passing cooling fluids, usually gases, therethrough substantially continuously.

---

This invention relates to a regenerative furnace especially adapted to the pyrolysis of hydrocarbons in a cyclic method or process; and to the method of operating such a furnace.

Conventional regenerative furnaces of the same general type are shown and described in Patents Nos. 2,956,864 and 2,967,205, and the earlier Patent No. 2,692,819. Such furnaces, in the pyrolysis of hydrocarbons to form acetylene and/or ethylene, are normally employed in banks of two, one of the furnaces engaging in a cracking step while the other is heating, and vice versa. Also, as is usual, each of such furnaces has a cyclical operation in which a heating step in one longitudinal direction is followed by a cracking step in the reverse direction, followed by a heating step in such reverse direction, and then a cracking step in such one direction, and repeating such steps many times. A common alternative cycle of operation is to heat in one longitudinal direction, followed by a cracking step in the same direction, followed by a heating step in a reverse direction, and then by a cracking step in such reverse direction, and repeating the cycle many times. Since each of the furnaces is cracking only about one-half the time, by using such a bank of two furnaces, a substantially constant and uniform flow of cracked-gas can be derived from such an installation.

Such conventional furnaces employ fuel nozzles extending into the furnace and adapted to supply fuel gas to the furnace, to be mixed with air therein and combusted, to provide the heat required during a heating step to bring the interior of the furnace up to the desired pyrolysis temperatures for a subsequent cracking step, all as shown and described in the above issued patents. Such pyrolysis temperatures, in the production of acetylene may be 1200° C. or higher, and only somewhat lower in the production of ethylene or a mixture of acetylene and ethylene. Such fuel nozzles being near the center of the furnace are exposed to such relatively high pyrolysis temperatures during the cracking steps of the furnace, and are exposed to even higher combustion temperatures during the heating steps of the furnace. Even though a specific nozzle may be cooled somewhat by cool fuel gas flowing therethrough during a heating step, still this occurs only about 25% of the time during operation, due to the cyclical operation of the furnace, and the average temperature of each nozzle tip remains nearly as high as such pyrolysis temperatures.

To attempt to resist such high temperatures, the fuel nozzles of such conventional regenerative furnaces have been made of heat resisting metal alloys, ceramics cermet, and other materials. Since normal operation of such a furnace exposes the fuel nozzles to alternative reducing and oxiding atmospheres, and thermal shock due to variations in the furnace and nozzle temperatures, the normal life of all such nozzles has been short, and it has been found that the nozzles must be replaced several times each year of operation, with an attendant downtime and loss of production of the furnace, and the substantial labor cost of replacing them, which are very undesirable and disadvantageous.

A primary object of this invention is to improve and substantially lengthen the effective life of such fuel nozzles in the operation of such a conventional regenerative furnace. We accomplish this by cooling such nozzles at all times during furnace operation, using the fuel gas passing through each nozzle for such purpose but additionally cooling each nozzle by passing a relatively cool purge gas therethrough when no fuel gas is flowing therethrough.

In the usual operation of such a conventional regenerative furnace, it has also been found that there is a diffusion of hydrocarbon gases back into the interior of each fuel nozzle during the periods that it is not in use conveying fuel to the furnace. Such hydrocarbon gases tend to deposit heavy tar or coke on the interior of the nozzle, causing a clogging of the nozzle that impedes the flow of fuel gas therethrough and may disrupt the heat balance of the furnace, which is a further disadvantage of the conventional method of operating such a furnace. Our present invention eliminates this disadvantage by preventing such diffusion of furnace gases into the fuel nozzles and thereby eliminates the possibility of such tar or coke deposition and clogging.

Other objects and advantages will appear from the following specification and the drawing, which are for the purpose of illustration only, and in which:

FIG. 1 is a diagrammatic longitudinal vertical sectional view through a furnace embodying our invention;

FIG. 2 is a schematic cross-sectional view taken on the line 2—2 of FIG. 1;

FIG. 3 is an enlarged vertical sectional view through one of the fuel nozzles of the furnace, taken on the line 3—3 of FIG. 2;

FIG. 4 is a schematic elevational view of the furnace of FIG. 1 and associated piping and valving;

FIG. 5 is a schematic view of a pair of furnaces connected to illustrate one cycle of operation;

FIG. 6 is a view similar to FIG. 5, but illustrating a second cycle of operation;

FIG. 7 is a view similar to FIGS. 5 and 6, but illustrating a third cycle of operation; and FIG. 8 is a view similar to FIGS. 5, 6, and 7, but illustrating a fourth cycle of operation.

In all interpretations of the acocmpanying specification and claims, the following definitions shall govern:

A "suitable hydrocarbon" is any hydrocarbon known to the art to be capable when pyrolyzed of forming acetylene and/or ethylene, or other unsaturated hydrocarbon compounds. Methane, ethane, propane, butane, gas oil, and other petroleum fractions, are among the many hydrocarbons which fall within this definition.

An "in-gas" is a gas containing a suitable hydrocarbon and which is delivered to a furnace for pyrolysis to produce a desired hydrocarbon.

A "desired hydrocarbon" is acetylene and/or ethylene or other unsaturated hydrocarbon, or a mixture thereof, formed by the pyrolysis of a suitable hydrocarbon in an in-gas.

An "off-gas" or "cracked gas" is a gas formed by pyrolysis of an in-gas, and containing a desired hydrocarbon.

A "cooling gas" is a fluid, usually a gas, which is relatively inert in and to the pyrolysis of a suitable hydrocarbon to form a desired hydrocarbon. Examples are steam, hydrogen, nitrogen, and carbon dioxide.

A "fuel gas" is a fluid, usually a gas, which is suitable for burning in a furnace to supply heat thereto, such as, for example, a suitable hydrocarbon. If a liquid is used therefor it will be vaporized in the furnace or its nozzles to gaseous form.

In the following specification and claims, the abbreviations "RH" for right-hand, and "LH" for left-hand are freely used to denote position as seen in the drawings.

Referring to FIGS. 1, 2, and 3 of the drawings, there is shown a conventional regenerative furnace 10, having a steel shell 11, inside the main portion of which is a heat refractory and heat insulating lining 12. Three heat refractory, heat regenerative masses 13, 14, and 15 are located inside the lining 12 and divide it into a LH plenum chamber 16, a LH combustion chamber or space 17, a RH combustion chamber or space 18, and a RH plenum chamber 19. The masses 13, 14, and 15 are preferably built up of conventional ceramic checkers to provide a plurality of uninterrupted longitudinal channels 20 through each of the masses, for conducting gases longitudinally through the furnace.

Communicating with the LH combustion chamber 17, through a plurality of nozzles 22, is a pair of LH manifolds 23 and 24 mounted vertically on the outside of the shell 11, and communicating with the RH combustion chamber 18 through a plurality of similar nozzles 22 is a pair of RH manifolds 25 and 26 similar to the LH manifolds. Each of the nozzles 22, one of which is shown in FIG. 3, is preferably formed of a heat-resisting material, such as a metal alloy, a ceramic, or cermet. Communicating with the LH manifolds 23 and 24 are LH pipes 27 and 28 which are joined to a main LH supply pipe 29, and communicating with the RH manifolds 25 and 26 are RH pipes 30 and 31 which are joined to a main RH supply pipe 32, as generally illustrated in FIGS. 2 and 4. As illustrated in FIG. 4, the supply pipes 29 and 32 are connected to a two-way valve 34, which in turn is connected to a fuel supply pipe 35, having a shut-off valve 36 therein. Connected to the supply pipes 29 and 32 are cooling gas supply pipes 37 and 38, respectively, having reducing valves 39 and 40 therein, respectively, the pipes 37 and 38 being connected to a main purge gas supply pipe 41.

Connected to the plenum chambers 16 and 19 are end pipes 43 and 44, respectively, which, as shown in FIGS. 4, 5, 6, 7 and 8, are connected to a four-way valve 45, to which are also connected pipes 46 and 47. As shown in FIG. 5, the pipe 46 is connected to a four-way valve 48, and the pipe 47 is connected to a four-way valve 49. The pipe 46 is adapted to be connected alternatively through the valve 48 with an in-gas pipe 50 or a stack pipe 51. The in-gas pipe 50 is supplied with in-gas from a feed pipe 52, a recycle pipe 53, and a steam pipe 54, each having a suitable valve therein. The stack pipe 51 is connected through a pump 56 with a stack or other point of discharge 57. The pipe 47 is adapted to be connected alternatively by the valve 49 with an air pipe 58 or an off-gas pipe 59. The air pipe 58 communicates with a source of air under low pressure and has a suitable valve therein, and the off-gas pipe 59 communicates through tar trap 60 and a pump 61 with a point of storage or use of off-gas (not shown). A second furnace 10a is identical with the furnace 10 and is connected by similar piping and valves to the four-way valves 48 and 49 and the cooling gas supply pipe 41, similar parts, piping, and valves being identified by the same numerals, but with the suffix a added In operation, the furnaces 10 and 10a are first preheated to the desired pyrolysis temperatures, as is conventional in the art and as described in the above-identified patents.

In a first make step of the furnace 10, as illustrated in FIG. 5, in-gas flows through the in-gas pipe 50, the four-way valve 48, the valve 45, and the pipe 43, into the LH plenum chamber 16 of the furnace 10 and flowing from the bottom to top therethrough (as seen in FIG. 5) to be cracked therein to form an off-gas which flows into the plenum chamber 19 and from it through the end pipe 44, the valve 45, the valve 49, and the off-gas pipe 59 to a point of storage or use.

FIG. 7 illustrates a second make step of the furnace 10, similar to the first make step thereof illustrated in FIG. 5 but in a reverse direction through the furnace. In it, feed gas is fed to the RH end of the furnace 10, through the pipes 50 and 46, the valve 45, and the end pipe 44, passing from right to left through the furnace 10, as seen in FIG. 1 to be cracked to form an off-gas which passes from the furnace through the end pipe 43, valve 45, pipe 47, valve 49, and pipe 59 to storage or use.

FIG. 6 illustrates a first heat step of the furnace 10, in which fuel gas flows through the fuel supply pipe 35 and the valves 36 and 34 therein, the main LH supply pipe 29 and its branch LH pipes 27 and 28 to the LH manifolds 23 and 24, respectively, whence it passes through their associated nozzles 22 into the LH combustion space 17. Air passes through the air pipe 58, the valve 49, the pipe 47, the valve 45, and the end pipe 43, into the LH plenum chamber 16, through the heat refractory mass 15 to cool it, and into the LH combustion chamber 17 where it mixes with the fuel gas therein and ignites to form hot products of combustion which pass thence through the central mass 14 to heat the same to pyrolysis temperature, through the RH combustion chamber 18, through the mass 13, and into the RH plenum chamber 19, whence the products of combustion flow through the end pipe 44, the valve 45, the pipe 46, and the valve 48, into the stack pipe 51 and to the stack 57 for discharge.

FIG. 8 illustrates a second heat step of the furnace 10, similar to the first heat step thereof illustrated in FIG. 6, but in a reverse direction through the furnace 10. In it, air is fed to the RH end of the furnace 10 from the end pipe 44, valve 45, pipe 47, valve 49, and pipe 58, such air passing through the furnace from right to left as seen in FIG. 1 and mixing in the RH combustion chamber 18 with fuel gas fed thereto by the RH supply pipe 32, valve 34, pipe 35, and valve 36. The products of combustion pass from the furnace 10 through the LH end pipe 43, valve 45, pipe 46, and valve 48 into the stack pipe 51 and to the stack 57.

As to the furnace 10a, its heat step illustrated in FIG. 5 is similar to the second heat step of the furnace 10 illustrated in FIG. 8, its make step illustrated in FIG. 6 is similar to the first make step of the furnace 10 illustrated in FIG. 5, its heat step illustrated in FIG 7 is similar to the first heat step of the furnace 10 illustrated in FIG. 6, and its make step illustrated in FIG. 8 is similar to the second make step of the furnace 10 illustrated in FIG. 7, the valve settings being as schematically indicated in the drawings. As will be understood, while furnace 10 is engaged in a make step, furnace 10a is engaged in a heat step, as illustrated in FIGS. 5 and 7, and while furnace 10 is engaged in a heat step, furnace 10a is engaged in a make step, as shown in FIGS. 6 and 8, to provide a substantially continuous flow of off-gas from the pair of furnaces and simultaneously a substantially constant, but separate, flow of products of combustion therefrom. This much of the operation of the furnaces 10 and 10a is conventional in the art.

The fuel gas supplied to the furnaces 10 and 10a during the heating steps thereof is normally relatively cool, at about the ambient atmospheric temperatures, and this serves to maintain the nozzles 22 cool, through which the fuel gas is passing, during such heating steps. A primary feature of the invention, however, is to supply a cool gas to the nozzles 22 during the other steps of the furnaces 10 and 10a in which no fuel gas is passed therethrough, to maintain such nozzles relatively cool during such steps in which the temperatures in the combustion spaces 17 and 18 frequently exceed 1200° C. Since such purge gas is supplied to the furnaces 10 and 10a during the make or cracking steps thereof in which pyrolysis reactions take place in the furnaces, such cooling gas preferably should be inert insofar as the pyrolysis reactions are concerned, so as not to interfere therewith. Steam, hydrogen, nitrogen and carbon dioxide are examples of suitable purge gases, although we prefer to employ steam where it is used as a diluent in the feed gas, as illustrated, simply because it is readily available in such a furnace installation.

The valves 39 and 40 are pressure reducing valves, designed to supply a cooling gas from the cooling gas supply pipe 41 to the supply pipes 29 and 32, respectively, at all times when the fluid pressure therein is somewhat below the pressure at which fuel gas is supplied through the fuel gas supply pipe 35. Thus, if the system is designed to supply fuel gas to the furnace 10 during a heating step at a pressure of about 5.0 p.s.i.g., which is conventional in such a system, the reducing valves 39 and 40 are adjusted or set to open when the fluid pressure downstream therefrom falls below about 2 p.s.i.g. and to close when it exceeds about 2 p.s.i.g., and this is an object of the invention. Such specific pressures are illustrative only, as it is only necessary that the reducing valves 39 and 40 open at a pressure less than the fuel gas pressure. For example, if the furnace 10 is operating at a pressure of 15″ Hg vacuum, the purge gas pressure may be as low as 10″ Hg vacuum. The result is that when fuel gas is flowing to the furnace 10 through either of the supply pipes 29 and 32, it will raise the pressure in the associated cooling gas supply pipe 37 or 38, and the associated reducing valve 39 or 40 will close automatically to stop the flow of purge gas to the furnace. It is also to be noted that in a heat step of the furnace 10 such as is illustrated in FIG. 6, although fuel gas is introduced into the LH combustion space 17 and therein mixed with air and fired, the three-way valve 34 is colsed to any flow of fuel gas through the pipe 32 to the RH combustion space 18. Therefore, the pressure in the pipe 32 will drop below the pressure for which the reducing valve 40 is set to open, and it will open to admit cool gas to the nozzles communicating with the manifolds 25 and 26 and to the combustion space 18. This will continue to cool such latter nozzles during such heating step even though no fuel gas is flowing therethrough, which is desirable. It also cools somewhat the hot products of combustion flowing from the central mass 14 into and through the combustion space 18, which is also very desirable to better reduce the temperature of the RH mass 13 to provide a quicker and better quench of the cracked gas on the next make step of the furnace.

Since in the usual operation of such a furnace 10 the pressure therein during a make, or cracking, step is below atmospheric pressure, and usually at about ½ atmosphere, and since this is substantially below the pressure for which the reducing valves 39 and 40 are set, relatively cool gas will flow into the furnace through all of its manifolds 23, 24, 25, and 26, and the nozzles 22 associated therewith, during both of the make steps of the furnace, to maintain the temperature of the nozzles 22 substantially below the high pyrolysis temperatures in the furnace and sufficiently low to prevent or substantially reduce damage to such nozzles which would otherwise occur due to such high pyrolysis temperatures in the furnace. Such flow of cooling gas through the nozzles 22 during a make step also insures no counter flow of hydrocarbon gas from the furnace into the nozzles, and prevents the clogging of the nozzles that otherwise occurs due to the coking of such hydrocarbon gases therein during a make step, and this is another advantage of the invention.

During the second heat step of the furnace 10, as illustrated in FIG. 8, cooling gas is delivered to the furnace as described above as to the first heat step thereof shown in FIG. 6, with the difference that the three-way fuel valve 34 is set to convey fuel gas to the RH combustion chamber 18 and to close off the flow of fuel gas to the LH chamber 17, cooling gas then flowing to the chamber 17. As will be understood, the flow of fuel and cooling gas to the furnace 10a in a heating step thereof such as illustrated in FIG. 5 is similar to that to the furnace 10 in its heating step illustrated in FIG. 8. Similarly, the flow of fuel and cooling gas to the furnace 10a in a heating step thereof such as illustrated in FIG. 7 is similar to that to the furnace 10 in its heating step illustrated in FIG. 6.

From the foregoing, it will be understood that each furnace 10 or 10a has four separate steps in each cycle, two heating steps and two make steps, that in each of the make steps cooling gas is conveyed through all of the nozzles 22 communicating with the manifolds thereof, that in one heating step fuel gas is conveyed through one set of nozzles and cooling gas through the other set, and in the other heating step fuel gas is conveyed through said other set of nozzles and cooling gas through said one set. Thus, cooling fuel gas is passed through a single set of nozzles once in each cycle and cooling gas is passed through such single set of nozzles three times in each cycle. This insures that all of the nozzles 22 are maintained at a safe temperature substantially below the temperatures existing in the spaces 17 and 18 during the cycle.

Although the furnace 10 has, for illustrative purposes only, been shown and described as containing end masses 13 and 15 with a single central mass 14 therebetween, to provide two combustion spaces 17 and 18, it is to be understood that the invention is equally adaptable to regenerative furnaces having a different arrangement of ceramic masses. For example, Patent No. 2,956,864 shows two end masses and multiple central masses, and Hasche Patent No. 2,751,424 shows only end masses with no central mass. The invention is applicable to all such furnaces which have fuel nozzles for intermittently conducting fuel gas into a combustion space between regenerative masses, which nozzles are subject to substantial, and normally damaging, variations in temperature.

Although we have shown and described a preferred embodiment of the invention, we do not intend to be limited thereto but desire to be afforded the full scope of the following claims.

We claim:

1. A cyclic method of operating a hot regenerative furnace having a pair of regenerative masses spaced apart to form a combustion space therebetween, and fuel injection means communicating with the combustion space, including the steps of:

a heating step consisting of conveying air through one of said masses and into said combustion space, injecting a relatively cool fuel gas through said fuel injection means and into said space to cool said injection means, combusting the fuel gas in said space, and passing the products of combustion through the other said mass to heat the same;

a cracking step consisting of conveying an in-gas through one of said masses, through said space, and through the other of said masses, to crack the in-gas to produce a cracked gas containing a desired hydrocarbon, and while injecting a relatively cool gas through said injection means to cool the same during said cracking step;

repeating said heating step in a reverse direction; and repeating said cracking step in a reverse direction, said method including the alternate passage of cool fuel gas and cooling gas through said injection means substantially continuously during the cyclic operation of the furnace to maintain said injection means substantially below the temperatures in said combustion space.

2. A cyclic method of operating a hot regenerative furnace having first and second regenerative end mass means and central regenerative mass means, spaced apart to form a first space between the first end mass means and the central mass meaans, and a second space between the second end mass means and the central mass means, first fuel injection means communicating with the first space, and second fuel injection means communicating with the second space, including the steps of:

- a heating step consisting of conveying air through one of said end mass means and into its associated space, injecting a relatively cool fuel gas into said space through its associated fuel injection means and thereby maintaining the latter relatively cool, combusting the fuel gas in said associated space and passing the products of combustion through the central mass means, the other space, and the other end mass means to heat the central and other end mass means while injecting a relatively cooling gas through the other injection means to cool the same and into the other space to mix with said products of combustion;
- a cracking step consisting of conveying an in-gas through one of said end mass means into its associated space, through said space, the central mass means, the other space, and the other end mass means, to crack the in-gas to produce a cracked gas containing a desired hydrocarbon while injecting a relatively cooling gas through both the first and second injection means to cool the same;

repeating said heating step in a reverse direction; and repeating said cracking step in a reverse direction.

3. A method as defined in claim 1, in which the pressure of the cooling gas is maintained above the pressure in the furnace, to prevent gases in the furnace from entering the injection means through which and while the cooling gas is flowing into the furnace, to prevent coking or clogging in such injection means.

4. A method as defined in claim 2, in which the pressure of the cooling gas is maintained below the pressure of the fuel gas to prevent the cooling gas from flowing through either injection means while fuel gas is flowing therethrough.

5. In a regenerative furnace for the pyrolysis of hydrocarbons, the combination of:
   first and second regenerative masses spaced apart to provide a space therebetween, each of said masses having longitudinal channels therethrough;
   injection means communicating with said space and adapted to inject gas thereinto, said injection means being susceptible of damage if heated to high temperatures existing in said space during normal furnace operation;
   a source of cool fuel gas;
   first means for conducting cool fuel gas from said source to said injection means to cool it below said temperatures;
   a source of inert cooling gas;
   second means responsive to fuel gas pressure in said first means for automatically supplying an inert cooling gas from said source to said injection means to cool it below said temperatures when no fuel gas is being supplied to said injection means.

6. In a regenerative furnace for the pyrolysis of hydrocarbons, such furnace having a first regenerative mass, a second regenerative mass axially aligned with and longitudinally spaced from said first mass to provide a first space therebetween, a third regenerative mass axially aligned with said second mass and longitudinally spaced therefrom to provide a second space therebetween, a first fuel injection means extending into said first space and including a plurality of nozzles, a second fuel injection means extending into said second space and including a plurality of nozzles, means for alternately supplying fuel gas to either of said fuel injection means or to stop the flow of gas to both thereof, and means for supply air or in-gas to either end of the furnace, in combination with:

means for supplying a cooling gas to one of said injection means while fuel is being supplied to the other and for supplying cooling gas to both of said injection means while fuel gas is supplied to neither.

7. A furnace as defined by claim 6, in which said means includes a pair of pressure reducing valves, one being located between the source of cooling gas and said first injection means and the other being located between said source and said second injection means, each of said valves being adapted to open to permit the passage of cooling gas therethrough into its associated injection means when the fluid pressure in said associated injection means falls below a predetermined value, and each valve being adapted ot close to prevent the passage of purge gas therethrough into its associated injection means when the fluid pressure in said associated injection means rises above a predetermined value.

References Cited

UNITED STATES PATENTS 2,956,864  10/1960  Coberly _____ 260—679
2,552,277   5/1951  Hasche _____ 23—277

DELBERT E. GANTZ, Primary Examiner

J. D. MYERS, Assistant Examiner

U.S. Cl. X.R.
23—277; 260—683